United States Patent [19]
Ohtani et al.

[11] Patent Number: 6,013,741
[45] Date of Patent: Jan. 11, 2000

[54] METHOD OF TERMINATING GAS PHASE POLYMERIZATION OF OLEFIN, METHOD OF INITIATING THE POLYMERIZATION AND APPARATUS THEREFOR

[75] Inventors: Satoru Ohtani; Kenji Doi; Tomohiro Arase; Ryouichi Yamamoto, all of Ichihara, Japan

[73] Assignee: Mitsui Chemicals, Inc., Tokyo, Japan

[21] Appl. No.: 08/927,964

[22] Filed: Sep. 11, 1997

[30] Foreign Application Priority Data

Sep. 12, 1996 [JP] Japan ................................. 8-241689
Jun. 26, 1997 [JP] Japan ................................. 9-170670

[51] Int. Cl.[7] ......................................................... C08F 2/38
[52] U.S. Cl. ................................. 526/84; 526/82; 526/901
[58] Field of Search ................................. 526/82, 84, 901

[56] References Cited

U.S. PATENT DOCUMENTS 4,306,044 12/1981 Charsley ................................. 526/84
4,786,695 11/1988 Cook et al. ........................... 526/84

FOREIGN PATENT DOCUMENTS 0697420  2/1996  European Pat. Off. .
2215802  8/1974  France .

*Primary Examiner*—Donald R. Wilson
*Assistant Examiner*—Roberto Rabago
*Attorney, Agent, or Firm*—Sherman and Shalloway

[57] ABSTRACT

A method of terminating a gas phase polymerization of an olefin to be conducted subsequent to producing a polyolefin by feeding a gaseous olefin into a fluidized bed reactor to polymerize the gaseous olefin while holding solid particles containing a catalyst in a fluid state, said method comprising introducing a deactivator in the fluidized bed reactor through at least two deactivator introduction ports of the fluidized bed reactor so as to terminate the gas phase polymerization. The height of the fluidized bed is generally at least 3 m. The deactivator is preferably introduced through deactivator introduction ports disposed at heights $H_a = -0.3\,D$ to $0.3\,D$ (a) and $H_b = 0.3\,D$ to $2.0\,D$ (b) (D is the inside diameter of the fluidized bed reactor (cm)). After the termination of the polymerization, the gas phase polymerization can directly be resumed. Formation of the product during the termination period can be minimized and the gas phase polymerization can rapidly be terminated even if the amount of the deactivator is small. Also, an apparatus which is suitable for the above termination and resumption of gas phase polymerization is provided.

17 Claims, 3 Drawing Sheets

METHOD OF TERMINATING GAS PHASE POLYMERIZATION OF OLEFIN, METHOD OF INITIATING THE POLYMERIZATION AND APPARATUS THEREFOR

FIELD OF THE INVENTION

The present invention relates to a method of terminating a gas phase polymerization of an olefin, a method of initiating a gas phase polymerization of an olefin and an apparatus for a gas phase polymerization.

BACKGROUND OF THE INVENTION

The film formed from a polyolefin including a linear low-density polyethylene (LLDPE) has various advantages such that it has excellent heat seal properties, it is flexible and tough, it is excellent in resistances to water, moisture and chemicals and its production cost is low. Thus, this film has widely been employed.

It is generally common practice to produce the above polyolefin by the liquid phase polymerization process such as the solution polymerization or suspension polymerization process. For example, LLDPE is usually produced by copolymerizing ethylene with an α-olefin having at least 4 carbon atoms using a titanium based catalyst (Ziegler catalyst) in the liquid phase polymerization process. Further, in recent years a metallocene catalyst comprising as a catalytic component a compound containing a metal of the group IVB in the periodic table such as zirconium, of which a ligand is a group having a cyclopentadienyl skeleton, has been developed as a catalyst capable of (co)polymerizing an olefin in high catalytic activity.

When the polyolefin is produced by the gas phase polymerization process, the polyolefin can be obtained in particulate form. Thus, it is unnecessary to conduct, for example, a step of precipitating particles from the polymer solution and a step of separating the particles, so that the production process can be simplified. In carrying out the process of gas phase polymerization of an olefin, the olefin in gaseous form is fed into the reactor at a lower part thereof so that solid particles comprising the catalyst and the produced polyolefin are fluidized to thereby form a fluidized bed.

In this gas phase polymerization, the termination of the polymerization after the production of the polyolefin is accomplished by not only terminating the supply of the catalyst and monomer to be polymerized but also depressurizing the inside of the reactor to thereby purge the internal gas from the reaction system, optionally along with replacing the monomer gas by an inert gas or along with feeding a deactivator through a monomer supply line.

However, in a catalytic system of a catalyst having high activity and prolonged life such as the above metallocene catalyst, its catalytic activity is retained for a certain period of time even after the inside of the reactor has been depressurized. Thus, the problem is encountered that the polymerization of the olefin is advanced even after the depressurization and the heat generated by the polymerization reaction causes fusing of the polyolefin remaining in the reactor to thereby invite an agglomeration thereof. When the agglomeration of the polyolefin occurs, not only is the fluidity deteriorated to thereby disenable use of the polyolefin as seed powder but also it is required to withdraw the agglomerated polyolefin from the reactor to thereby bring about an economic disadvantage.

In order to rapidly terminate the polymerization reaction of the olefin in the above catalytic system of high activity and prolonged life, a deactivator is fed in the reactor for terminating the polymerization of the olefin and, in such a case, the infiltration of the deactivator comes to a rate-determining factor. Thus, prior to the polymerization terminating operation, preparatory steps for the termination of the polymerization are effected, such as withdrawing the polyolefin from the fluidized bed reactor so as to reduce the amount of solid particles therein or performing the polymerization of the olefin under such conditions that the polymerization activity is lowered.

However, the practical value of the polyolefin produced through the above preparatory steps for the termination of the polymerization (hereinafter may be referred to as "product produced during the termination period") is very low. Therefore, it is desired to rapidly terminate the polymerization of the olefin without inviting the occurrence of the product produced during the termination period.

Moreover, when the polymerization of the olefin has been terminated by the use of a large amount of deactivator in high concentration, a treatment for removing the deactivator must be added for using the polyolefin remaining in the reactor as seed powder in the subsequent polymerization reaction.

Therefore, there has been a strong demand for a method of terminating a gas phase polymerization of an olefin, a method of initiating a gas phase polymerization of an olefin and an apparatus suitable for use in the above methods, which, especially in the gas phase polymerization of an olefin in the presence of a catalyst of high activity and prolonged life, enable rapidly terminating the polymerization of the olefin without the occurrence of the product produced during the termination period even if the amount of used deactivator is small and enable using the seed powder remaining in the fluidized bed reactor after the termination of the polymerization of the olefin, as it is, in the subsequent gas phase polymerization.

OBJECT OF THE INVENTION

It is an object of the present invention to provide a method of terminating a gas phase polymerization of an olefin which enables minimizing the occurrence of the product produced during the termination period and enables rapidly terminating the polymerization of the olefin even if the amount of used deactivator is small. It is another object of the present invention to provide a method of initiating a gas phase polymerization of an olefin in which the solid particles obtained after the termination of the polymerization of the olefin according to the above termination method is used as a seed powder for polymerization initiation. It is a further object of the present invention to provide an apparatus for a gas phase polymerization of an olefin which can suitably be employed in carrying the above methods.

SUMMARY OF THE INVENTION

In one aspect of the present invention, there is provided a method of terminating a gas phase polymerization of an olefin to be conducted subsequent to producing a polyolefin by feeding a gaseous olefin into a fluidized bed reactor to polymerize the gaseous olefin while holding solid particles containing a catalyst in a fluid state, this method comprising introducing a deactivator in the fluidized bed reactor through at least two deactivator introduction ports of the fluidized bed reactor so as to terminate the gas phase polymerization. The height of the fluidized bed formed in the fluidized bed reactor is generally at least 3 m.

In the introduction of the deactivator in the fluidized bed reactor having a gas distributor plate provided therein through said at least two deactivator introduction ports of the fluidized bed reactor, it is preferred that the deactivator be introduced in the fluidized bed reactor through:

(a) at least one deactivator introduction port disposed at height Ha (cm) as measured from the gas distributor plate, the above height Ha satisfying the relationship:

Ha=−0.3 D to 0.3 D wherein D represents the inside diameter (cm) of the fluidized bed reactor, and (b) at least one deactivator introduction port disposed at height Hb (cm) as measured from the gas distributor plate, the above height Hb satisfying the relationship:

Hb=0.3 D to 2.0 D wherein D represents the inside diameter (cm) of the fluidized bed reactor.

The deactivator for use in the present invention is preferred to be at least one member selected from the group consisting of carbon monoxide, carbon dioxide, oxygen, water, alcohols having 1 to 6 carbon atoms, ketones having 1 to 6 carbon atoms and aldehydes having 1 to 6 carbon atoms and is preferred to be gaseous under gas phase polymerization conditions.

The above deactivator can be introduced together with an inert gas and/or an olefin gas into the fluidized bed reactor.

In another aspect of the present invention, there is provided a method of initiating a gas phase polymerzation of an olefin, which comprises, after terminating the gas phase polymerization by the above method, feeding an olefin into the fluidized bed reactor and effecting a gas phase polymerization of the olefin in the presence of the solid particles remaining in the fluidized bed reactor. The desired polyolefin can be obtained by initiating the gas phase polymerization according to the above method and carrying on the gas phase polymerization.

In a further aspect of the present invention, there is provided an apparatus for a gas phase polymerization of an olefin which comprises a fluidized bed reactor having an olefin feeding port each provided at a bottom part of said reactor, and a catalyst feeding port and a polyolefin recovering port provided at side part of the said reactor, said reactor having further provided with at least two deactivator introduction ports.

Preferably, the at least two deactivator introduction ports comprises:

(a) at least one deactivator introduction port disposed at height Ha (cm) as measured from the gas distributor plate, the above height Ha satisfying the relationship:

Ha=−0.3 D to 0.3 D wherein D represents the inside diameter (cm) of the fluidized bed reactor, and (b) at least one deactivator introduction port disposed at height Hb (cm) as measured from the gas distributor plate, the above height Hb satisfying the relationship:

Hb=0.3 D to 2.0 D wherein D represents the inside diameter (cm) of the fluidized bed reactor.

DETAILED DESCRIPTION OF THE INVENTION

Figure 1:
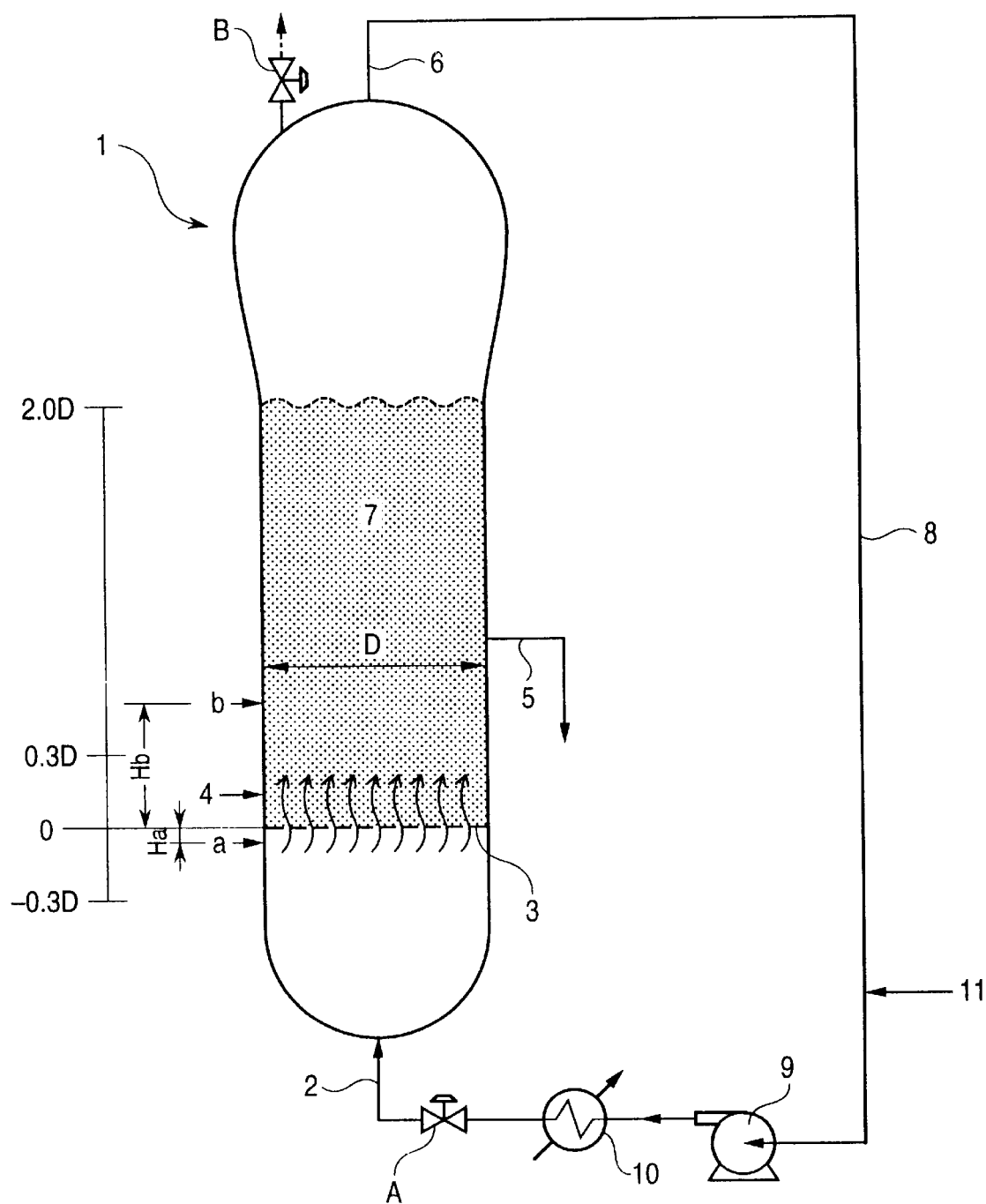
FIG. 1 is a schematic longitudinal sectional view of one embodiment of the fluidized bed reactor for use in the present invention.

The method of terminating a gas phase polymerization of an olefin, method of initiating a gas phase polymerization of an olefin and apparatus for a gas phase polymerization according to the present invention will now be described in detail.

The term "polymerization" used herein may mean not only homopolymerization but also both of homopolymerization and copolymerization. Further, the term "polymer" used herein may mean not only homopolymer but also both homopolymer and copolymer.

Method of Terminating a Gas Phase Polymerization of an Olefin

In the present invention, subsequent to producing a polyolefin by feeding a gaseous olefin into a fluidized bed reactor to polymerize the gaseous olefin while holding solid particles containing a catalyst in a fluid state, the gas phase polymerization of the olefin is terminated by introducing a deactivator in the fluidized bed reactor through at least two deactivator introduction ports of the fluidized bed reactor.

The common gas phase polymerization of an olefin will first briefly be described with reference to FIG. 1.

A catalyst is fed through a feeding port 4 into the fluidized bed reactor 1. An olefin is continuously blown into the fluidized bed reactor 1 through a fluidizing gas feeding port 2 disposed at a bottom part of the fluidized bed reactor 1 and through a gas distributor plate 3 such as a porous plate by means of a gas blower 9, so that solid particles containing the catalyst are held in a fluid state to thereby form a fluidized bed (reaction system) 7.

Figure 2:
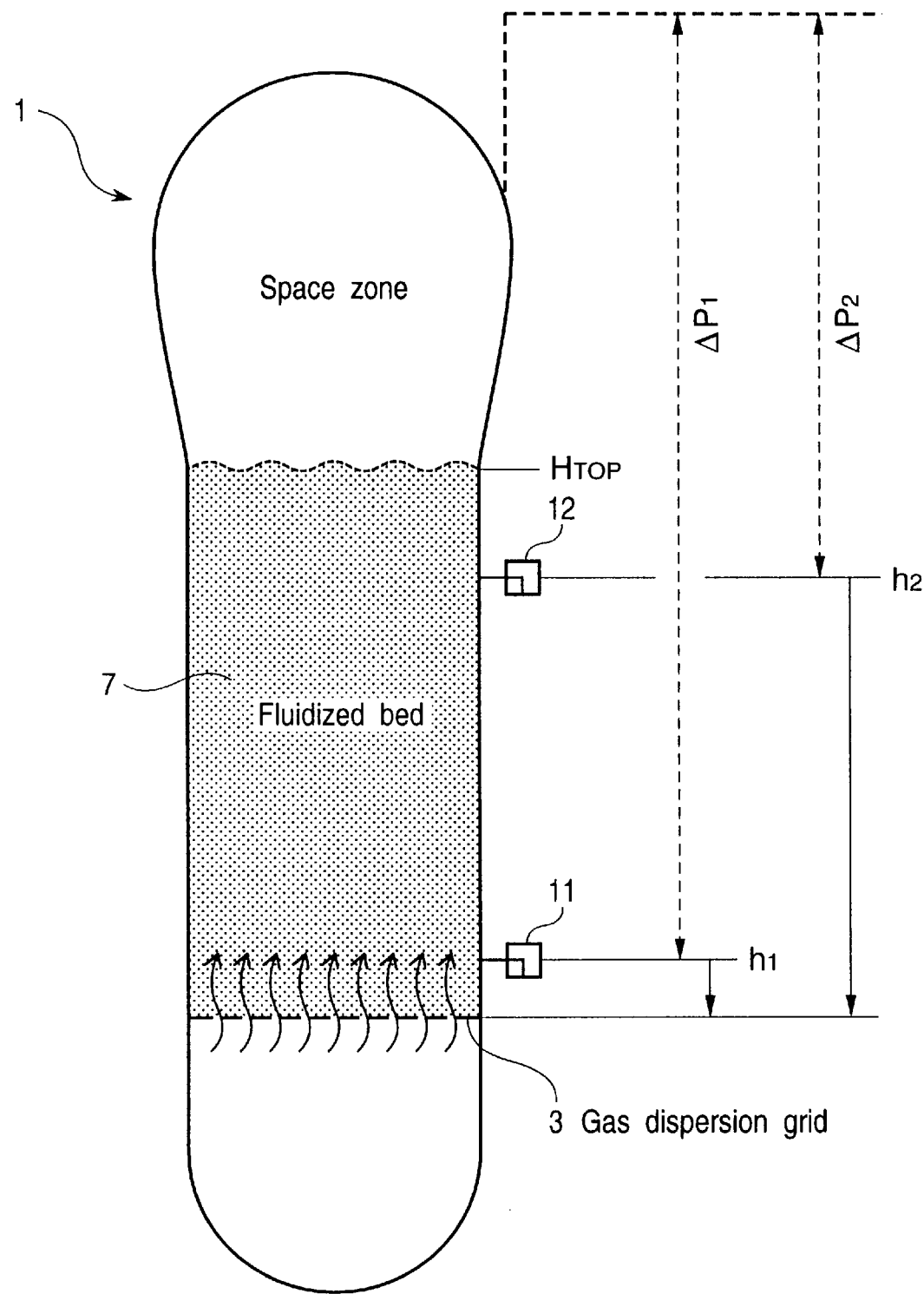
FIG. 2 is a view showing the position of a differential pressure gauge set for measuring the height of the fluidized bed.

In the present invention, it is preferred that a fluidized bed having a height of at least 3 m be formed in the above manner. Referring to FIG. 2, for example, the height of the fluidized bed, namely, the distance H$_{TOP}$ of from the bottom of the fluidized bed (gas distributor plate 3) to the powder face of the fluidized bed can be determined by the formula:

$$H_{TOP} \text{ (cm)} = \frac{\Delta P_1 (h_2 - h_1)}{\Delta P_1 - \Delta P_2} + h_1 \text{ (cm)} \qquad (i)$$

wherein, $h_2 - h_1 > 0$, $\Delta P_1$ (g/cm$^2$): difference of pressure between a point within the fluidized bed which has a height ($h_1$ cm) from the bottom of the fluidized bed and nonfluid space zone in the reactor higher than the top of the fluidized bed, and $\Delta P_2$ (g/cm$^2$): difference of pressure between a point within the fluidized bed which has a height ($h_2$ cm) from the bottom of the fluidized bed and nonfluid space zone in the reactor higher than the top of the fluidized bed.

The above pressure difference can be measured by the device commonly employed in the measuring of a pressure difference. For example, the above pressure difference can be measured by a diaphragm type differential pressure transmitter 11 and 12. The hight $h_1$ of the lower measuring position within the fluidized bed is preferred to be of a value as small as possible (i.e., close to the bottom of the fluidized bed), and the height $h_2$ of the upper measuring position within the fluidized bed is preferably set at a value of at least ½ of the height H of the fluidized bed.

In the present invention, use can be made of a wide variety of catalysts commonly employed in the polymerization of an olefin, such as Ziegler type titanium catalysts and Phillips type chromium oxide catalysts. Of these catalysts, a highly active metallocene catalyst is preferably used. The details of this catalyst and starting olefin will be described later.

The fluidizing gas blown through the feeding port 2 into the fluidized bed reactor may contain an inert gas, such as nitrogen gas, together with the olefin. The fluidizing gas is generally blown into the fluidized bed reactor at a linear velocity of about 0.4 to 1.5 m/sec, preferably, about 0.6 to 1.2 m/sec.

The olefin which is consumed by the polymerization reaction can be supplied through an arbitrary site of the gas phase polymerization apparatus. For example, the olefin is generally supplied in gaseous form through a line 11.

The above polymerization of olefin can be performed if desired in the presence of a molecular weight modifier such as hydrogen. The molecular weight modifier can be supplied through an arbitrary site, for example, the line 11 of the gas phase polymerization apparatus.

Polyolefin particles formed in the fluidized bed 7 are continuously or intermittently withdrawn from the fluidized bed reactor through a polyolefin recovering port 5 (discharge port).

On the other hand, the gas discharged from the above fluidized bed reactor 1 through a gas exhaust port 6 disposed at an upper part of the fluidized bed reactor 1 contains unreacted olefin and inert gas and is circulated through a circulation line 8 into the fluidized bed reactor 1 by means of a gas blower 9. Prior to the introduction of the exhaust gas into the fluidized bed reactor 1, it is preferred that the exhaust gas be removed of the heat of polymerization by means of a heat exchanger 10. The thus recovered heat of polymerization can be used to heat fresh olefin supplied from the line 11 into the circulation line 8. Although FIG. 1 shows an arrangement in which the heat exchanger 10 is disposed downstream of the gas blower 9, the heat exchanger 10 may be disposed upstream of the gas blower 9.

In the present invention, after the above production of the polyolefin, the polymerization of the olefin is terminated by introducing a deactivator into the fluidized bed reactor 1 through at least two deactivator introduction ports (feed nozzles) of the fluidized bed reactor 1 which are disposed separately from the catalyst feeding port 4 and the fluidizing gas feeding port 2.

This feature of the present invention will be described in greater detail below with reference to FIG. 1. The polymerization of the olefin is generally terminated by discontinuing the supply of the catalyst and olefin, stopping the gas blower 9, opening a flare valve B so as to purge the internal gas from the reaction system (depressurizing the inside of the fluidized bed reactor), closing a valve A and introducing the deactivator.

In the present invention, as mentioned above, the deactivator is introduced into the fluidized bed reactor 1 through at least two deactivator introduction ports. In particular, it is preferred that the deactivator be introduced into the fluidized bed reactor 1 having a gas distributor plate 3 through at least two deactivator introduction ports including:

(a) a deactivator introduction port disposed at height Ha (cm) as measured from the gas distributor plate 3, the above height Ha satisfying the relationship:

Ha=−0.3 D to 0.3 D, especially,

Ha=−0.25 D to 0.25 D, wherein D represents the inside diameter (cm) of the fluidized bed reactor, and/or (b) a deactivator introduction port disposed at height Hb (cm) as measured from the gas distributor plate 3, the above height Hb satisfying the relationship:

Hb=0.3 D to 2.0 D, especially,

Hb=0.5 D to 1.0 D wherein D represents the inside diameter (cm) of the fluidized bed reactor.

Illustratively, it is preferred that, generally, 2 to 20, preferably, 3 to 15 and, still preferably, 4 to 6 deactivator introduction ports (a) be disposed at the height Ha (cm) as measured from the gas distributor plate 3, which height Ha is in the range of −0.3 D to 0.3 D, wherein D represents the inside diameter (cm) of the fluidized bed reactor. For example, it is preferred that such deactivator introduction ports (a) be disposed at the height just above and/or just below the gas distributor plate 3 within +30 cm from the gas distributor plate 3.

Further, it is preferred that, generally, 2 to 20, preferably, 3 to 15 and, still preferably, 4 to 6 deactivator introduction ports (b) be disposed at height Hb (cm) as measured from the gas distributor plate 3, which height Hb is in the range of 0.3 D to 2.0 D, wherein D represents the inside diameter (cm) of the fluidized bed reactor.

In the present invention, the deactivator may be introduced into the fluidized bed reactor 1 through at least two deactivator introduction ports disposed in either of the height Ha and Hb in the above range and also may be introduced through deactivator introduction ports disposed in both of the height Ha and Hb in the above range, respectively. Of these, it is preferred that the deactivator be introduced through deactivator introduction ports disposed in both of the height Ha and Hb, namely, through at least one deactivator introduction port (a) and at least one deactivator introduction port (b).

When a plurality of deactivator introduction ports are disposed in the above height Ha or Hb in the above height range, the plurality of deactivator introduction ports (a) or (b) may be disposed either at different heights Has or Hbs from each other or at identical height Ha or Hb in the above height range. When the plurality of deactivator introduction ports are disposed at identical height Ha or Hb in the height range, it is preferred that the deactivator introduction ports be spaced from each other at equal intervals on a single circumference.

Figure 3:
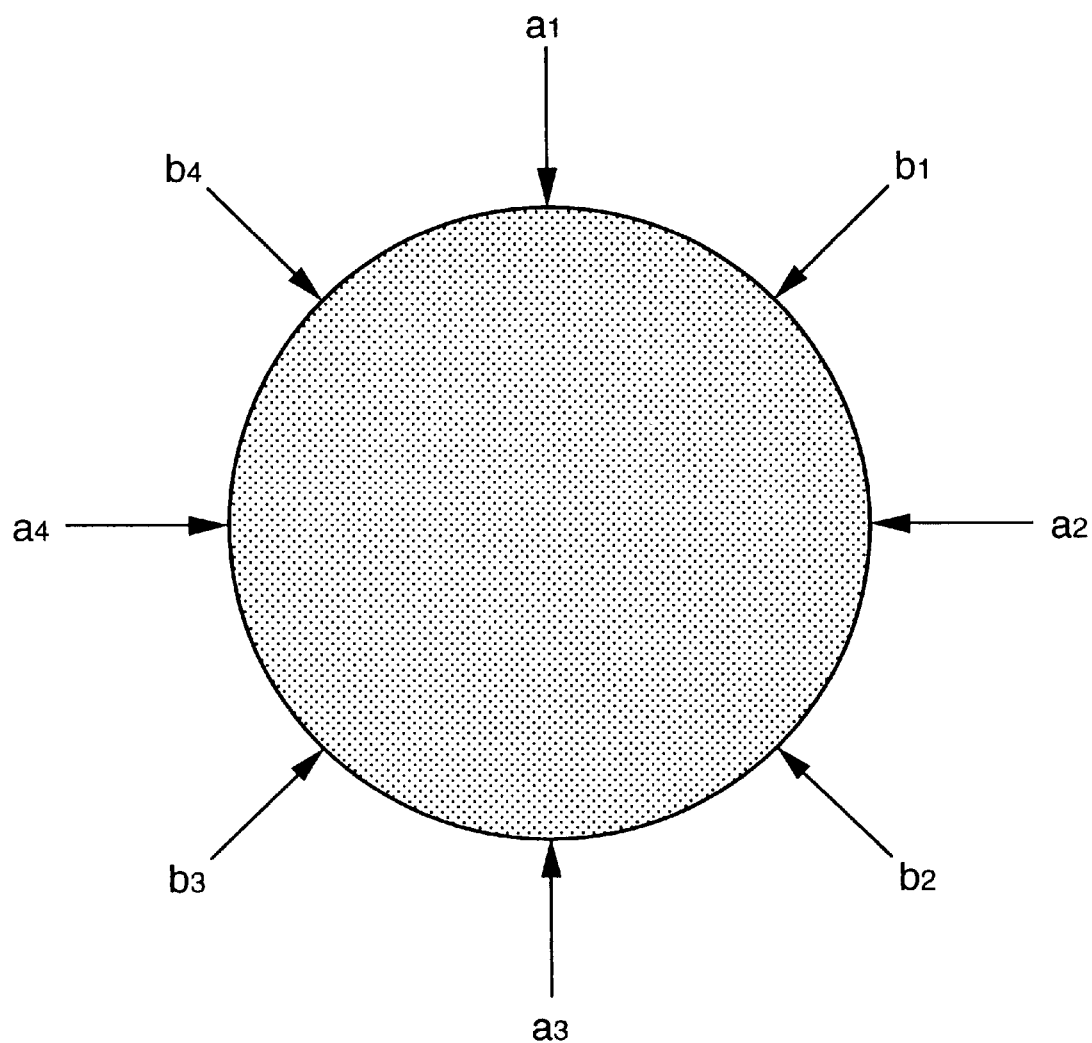
FIG. 3 is a schematic plan view of one embodiment of a deactivator introduction port part of the fluidized bed reactor for use in the present invention.

When the plurality of deactivator introduction ports (a) and (b) are disposed on a single circumference in the heights Ha and Hb, it is preferred that the deactivators be introduced through the deactivator introduction ports (a) and (b) alternatively disposed at mutually equal intervals when viewed from the top of the fluidized bed reactor as shown in FIG. 3. FIG. 3 (plan view) shows the arrangement of four deactivator introduction ports $a_1$ to $a_4$ (first series) and four deactivator introduction ports $b_1$ to $b_4$ (second series) on single circumferences of the heights Ha and Hb, respectively.

In the present invention, the introduction of the deactivator into the fluidized bed reactor 1 may be further effected through the catalyst feeding port 4 and the fluidizing gas feeding port 2 in addition to the above deactivator introduction ports.

A wide variety of compounds known as olefin polymerization deactivators can be used as the deactivator in the present invention as long as they can rapidly deactivate the activity points which are present in the fluidized bed reactor to thereby inhibit the polymerization of the olefin and as long as they are volatile compounds which become gaseous under gas phase polymerization conditions. For example, use can be made of at least one member selected from the group consisting of carbon monoxide, carbon dioxide, oxygen, water, alcohols having 1 to 6 carbon atoms, ketones having 1 to 6 carbon atoms and aldehydes having 1 to 6 carbon atoms. Of these, an alcohol or aldehyde having 1 to 2 carbon atoms, a ketone having 2 to 3 carbon atoms, carbon monoxide and carbon dioxide are preferred.

The deactivator can generally be introduced in an amount of 0.3 to 1000 mol/m$^3$·hr, preferably, 0.5 to 100 mol/m$^3$·hr or about 1 mol/kg of polymer present in the fluidized bed reactor, depending on the type and amount of the catalyst present in the fluidized bed reactor.

The above deactivator may either be directly introduced in the fluidized bed reactor in gaseous form or may be diluted with an inert gas or an olefin gas before being introduced in the fluidized bed reactor.

Any inert gas can be used as long as it has no polymerization activity. The inert gas employed in the present invention is, for example, nitrogen, helium, neon, argon, methane, ethane, propane, iso-propane, butane or iso-butane.

With respect to the supply of the deactivator, the deactivation of the polymerization catalyst can be more effectively carried out by feeding a monomer gas discharged from the fluidized bed reactor and containing the deactivator to, for example, a blower and circulating the deactivator to the fluidized bed reactor thereby.

In the present invention, as described above, the deactivator is introduced from a multiplicity of points of the fluidized bed reactor, so that, even if a small amount of deactivator is employed in low concentration, the deactivator can rapidly infiltrate to activity points of the catalyst which are present in the fluidized bed reactor to thereby enable rapidly and easily terminating the polymerization of the olefin. Thus, the polymerization reaction of the olefin can be terminated without any agglomeration in the fluidized bed reactor. Accordingly, even when a polymerization catalyst of high activity and prolonged life is employed, the polymerization terminating operation can immediately be initiated without the need to effect any preparatory step for the termination of the polymerization of the olefin with the result that the amount of the product produced during the termination period can be minimized. Moreover, when the polymerization terminating operation is conducted in the above manner, fluid solid particles remain in the fluidized bed reactor, which can directly be used as the seed powder for initiating the polymerization of the olefin. When the fluid solid particles are used as the seed powder, treatment for removing the deactivator may be conducted. However, this is not essential and the subsequent polymerization of the olefin can be initiated without conducting the removal of the deactivator.

Method of Initiating a Gas Phase Polymerization of an Olefin

In the present invention, after the above termination of the polymerization, the gas phase polymerization of the olefin can be resumed by feeding the olefin into the fluidized bed reactor in which the solid particles remain to thereby enable polymerization of the olefin using the solid particles as a seed powder. The solid particles are suitable for use as the seed powder for initiating the polymerization of the olefin because they do not agglomerate with each other as mentioned above and maintain strikingly high fluidity. Although in the present invention the polymerization of the olefin can be resumed with the use of the fluidized bed reactor having its inside left intact after the above termination of the polymerization, it is preferred that the inside of the fluidized bed reactor be purged with an inert gas such as nitrogen gas prior to the initiation of the polymerization of the olefin.

The thus initiated gas phase polymerization of the olefin is carried out in the manner as described above. In particular, examples of olefins suitably employed in the present invention include α-olefins having 2 to 18 carbon atoms, such as ethylene, propylene, 1-butene, 1-pentene, 1-hexene, 4-methyl-1-pentene, 1-octene and 1-decene, and further include cycloolefins having 2 to 18 carbon atoms. These may be homopolymerized or copolymerized.

If desired, the above olefin may be copolymerized with another copolymerizable monomer, for example, selected from among a vinyl monomer such as styrene, vinyl chloride, vinyl acetate, vinyl acrylate, methyl methacrylate, tetrafluoroethylene, vinyl ether or acrylonitrile, a conjugated diene such as butadiene or isoprene, a nonconjugated polyene such as 1,4-hexadiene, dicyclopentadiene or 5-vinyl-2-norbornene, an acetylene compound such as acetylene or methylacetylene and an aldehyde such as formaldehyde.

The polymerization pressure generally ranges from atmospheric pressure to 100 kg/cm$^2$, preferably, from atmospheric pressure to 50 kg/cm$^2$ and the polymerization temperature generally ranges from 50 to 120° C., preferably, from 60 to 100° C., though the polymrization conditions may be determined depending on the type of the employed olefin, the copolymerization proportion and the linear velocity of the fluidizing gas. The polymerization of the olefin can be conducted in at least two stages wherein the reaction conditions are different from each other.

The molecular weight of the obtained polyolefin can be regulated by varying the polymerization conditions such as polymerization temperature and by controlling the amount of added hydrogen (as a molecular weight modifier).

In the present invention, preferred use is made of, for example, a metallocene catalyst comprising:

[A] a metallocene compound of a transition metal of the group IVB in the periodic table, and

[B] at least one compound selected from among:
  (B-1) an organoaluminum oxy compound,
  (B-2) an organoaluminum compound, and
  (B-3) a compound which reacts with the metallocene compound [A] to thereby form an ion pair.

The above metallocene compound [A] is specifically represented by the formula:

ML$x$        (i)

wherein M represents a transition metal selected from the group consisting of Zr, Ti, Hf, V, Nb, Ta and Cr; L represents a ligand which coordinates with the transition metal provided that at least one L is a ligand having a cyclopentadienyl skeleton and each of the L(s) other than the ligand having a cyclopentadienyl skeleton is a hydrogen atom, a halogen atom, a hydrocarbon group having 1 to 12 carbon atoms, an alkoxy group, an aryloxy group, a trialkylsilyl group or a group of the formula SO$_3$R (R is a hydrocarbon group having 1 to 8 carbon atoms which may have a substituent such as a halogeno), and x is the valence of the transition metal.

The above ligand having a cyclopentadienyl skeleton is, for example, a cyclopentadienyl group, an alkyl substituted cyclopentadienyl group such as a methylcyclopentadienyl group, a dimethylcyclopentadienyl group, a trimethylcyclopentadienyl group, a tetramethylcyclopentadienyl group, a pentamethylcyclopentadienyl group, an ethylcyclopentadienyl group, a methylethylcyclopentadienyl group, a propylcyclopentadienyl group, a methylpropylcyclopentadienyl group, a butylcyclopentadienyl group, a methylbutylcyclopentadienyl group or a hexylcyclopentadienyl group, an indenyl group, a 4,5,6,7-tetrahydroindenyl group or a fluorenyl group. These groups may be substituted with a halogen atom, a trialkylsilyl group or the like.

Of the above groups, the alkyl substituted cyclopentadienyl group is especially preferred.

Examples of the ligands other than the ligand having a cyclopentadienyl skeleton include halogens such as fluoro, chloro, bromo and iodo; hydrocarbon groups having 1 to 12 carbon atoms inclusive of alkyl groups such as a methyl group, an ethyl group, a propyl group, an isopropyl group and a butyl group, cycloalkyl groups such as a cyclopentyl group and a cyclohexyl group, aryl groups such as a phenyl group and a tolyl group and aralkyl groups such as a benzyl group and a neophyl group; alkoxy groups such as a methoxy group, an ethoxy group and a butoxy group; aryloxy groups such as a phenoxy group; and groups of the formula $SO_3R$ such as a p-toluenesulfonate group, a methanesulfonate group and a trifluoromethanesulfonate group.

When the compound of the above general formula (i) contains at least two groups having a cyclopentadienyl skeleton, two groups having a cyclopentadienyl skeleton may be bonded with each other through an alkylene group such as ethylene or propylene, a substituted alkylene group such as isopropylidene or diphenylmethylene, a silylene group or a substituted silylene group such as a dimethylsilylene group, a diphenylsilylene group or a methylphenylsilylene group. At least two kinds of metallocene compounds [A] can be used in combination.

The above organoaluminum oxy compound (B-1) may be the conventional benzene-soluble aluminoxane and may be benzene-insoluble organoaluminum oxy compounds disclosed in Japanese Patent Laid-open Publication No. 2 (1990)-27687.

The above organoaluminum compound (B-2) is represented by, for example, the following general formula:

$$R^1{}_nAlX_{3-n} \qquad (i)$$

wherein $R^1$ represents a hydrocarbon group having 1 to 12 carbon atoms, X represents a halogen atom or a hydrogen atom, and n is 1 to 3.

In the above general formula (i), $R^1$ represents a hydrocarbon group, such as an alkyl group, a cycloalkyl group or an aryl group, having 1 to 12 carbon atoms. Examples of suitable hydrocarbon groups include a methyl group, an ethyl group, an n-propyl group, an isopropyl group, an isobutyl group, a pentyl group, a hexyl group, an octyl group, a cyclopentyl group, a cyclohexyl group, a phenyl group and a tolyl group.

Further, the organoaluminum compound (B-2) may be represented by the following general formula:

$$R^1{}_nAlY_{3-n} \qquad (ii)$$

wherein $R^1$ is as defined above in the general formula (i), Y represents a group of the formula $-OR^2$, $-OSiR^3{}_3$, $-OAlR^4{}_2$, $-NR^5{}_2$, $-SiR^6{}_3$ or $-N(R^7)AlR^8{}_2$, and n is 1 to 2. Each of $R^2$, $R^3$, $R^4$ and $R^8$ represents, for example, a methyl group, an ethyl group, an isopropyl group, an isobutyl group, a cyclohexyl group or a phenyl group. $R^5$ represents, for example, a hydrogen atom, a methyl group, an ethyl group, an isopropyl group, a phenyl group or a trimethylsilyl group. Each of $R^6$ and $R^7$ represents, for example, a methyl group or an ethyl group.

The above compound (B-3) which reacts with the metallocene compound [A] to thereby form an ion pair is, for example, selected from among such Lewis acids, ionic compounds and carborane compounds as described in, for example, Japanese Patent Laid-open Publication Nos. 1(1989)-501950, 1(1989)-502036, 3(1991)-179005, 3(1991)-179006, 3(1991)-207703 and 3(1991)-207704 and EP-A-0468651.

Examples of suitably employed Lewis acids include triphenylboron, tris(4-fluorophenyl)boron, tris(p-tolyl) boron, tris(o-tolyl)boron, tris(3,5-dimethylphenyl)boron, tris(pentafluorophenyl)boron, $MgCl_2$, $Al_2O_3$ and $SiO_2$—$Al_2O_3$.

Examples of suitably employed ionic compounds include triphenylcarbenium tetrakis(pentafluorophenyl)borate, tri-n-butylammonium tetrakis(pentafluorophenyl)borate, N,N-dimethylanilinium tetrakis(pentafluorophenyl)borate and ferrocenium tetra(pentafluorophenyl)borate.

Examples of suitably employed carborane compounds include dodecaborane, 1-carbaundecaborane, bis-n-butylammonium 1-carbedodecaborate, tri-n-butylammonium 7,8-dicarbaundecaborate and tri-n-butylammonium tridecahydride-7-carbaundecaborate.

In the present invention, at least one compound selected from among the above compounds (B-1), (B-2) and (B-3) can be used as cocatalyst component [B]. Also, use can be made of an appropriate combination of these compounds. It is preferred that at least the compound (B-2) or (B-3) be used as cocatalyst component [B].

The above metallocene compound [A] and/or cocatalyst component [B] is generally contacted with a particulate support compound so as to form a solid catalyst before use.

Suitably employed support compound is generally in the form of a granular or particulate solid having a diameter of 10 to 300 μm, preferably, 20 to 200 μm. This support compound has a specific surface area generally ranging from 50 to 100 m²/g and is preferred to have a pore volume ranging from 0.3 to 2.5 cm³/g.

A porous inorganic oxide is preferably used as the support compound. Examples of suitably employed support compounds include $SiO_2$, $Al_2O_3$, MgO, $ZrO_2$, $TiO_2$, $B_2O_3$, CaO, ZnO, BaO and $ThO_2$. Also, use is made of mixtures thereof, for example, $SiO_2/MgO$, $SiO_2/Al_2O_3$, $SiO_2/TiO_2$, $SiO_2/V_2O_5$, $SiO_2/Cr_2O_3$ and $SiO_2/TiO_2/MgO$. Of these, the support compound containing $SiO_2$ and/or $Al_2O_3$ as a main component are preferred.

The above inorganic oxide may contain a small amount of a carbonate, sulfate, nitrate or oxide component, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ or $Li_2O$.

An organic compound can be used as the support. For example, use can be made of (co)polymers produced from monomers comprising as a main component an α-olefin having 2 to 14 carbon atoms such as ethylene, propylene, 1-butene or 4-methyl-1-pentene or homopolymers or copolymers produced from monomers comprising vinylcyclohexane or styrene as a main component.

It is preferred that the above contact of the metallocene compound [A] and cocatalyst component [B] with the support be generally conducted at –50 to 150° C., especially, –20 to 120° C. for 1 min to 50 hr, especially, 10 min to 25 hr. This contact can also be conducted in an inert hydrocarbon solvent.

The thus prepared solid catalyst is preferred to bear the metallocene compound [A] in an amount of $5\times10^{-6}$ to $5\times10^{-4}$ gram-atom, especially, $10^{-5}$ to $2\times10^{-4}$ gram-atom in terms of transition metal atom per g of the support and bear the component [B] in an amount of $10^{-3}$ to $5\times10^{-2}$ gram-atom, especially, $2\times10^{-3}$ to $2\times10^{-2}$ gram-atom in terms of aluminum atom or boron atom per g of the support.

In the present invention, although this solid catalyst can be used as it is in the polymerization of the olefin, a prepolymerization of the olefin may be executed on the solid catalyst to thereby form a prepolymerization catalyst before use in the main polymerization of the olefin.

In the present invention, it is preferred that the solid catalyst or prepolymerization catalyst be generally used in an amount of 0.00001 to 1.0 mmol/hr, especially, 0.0001 to 0.1 mmol/hr in terms of transition metal atom of the metallocene compound [A] per liter of polymerization volume.

When the prepolymerization catalyst is employed, it is optional to additionally introduce the component [B] in the main polymerization. The component [B] can be added according to necessity in an amount of 5 to 300, preferably, 10 to 200 and, still preferably, 15 to 150 in terms of an atomic ratio of aluminum or boron of the component [B] to transition metal of the reaction system (ratio of Al or B/transition metal).

The above gas phase polymerization of the olefin may be carried out according to any of the batch, continuous and semicontinuous processes.

The polyolefin can be obtained in granular form by the above gas phase polymerization of the present invention. The average grain size of the polyolefin is preferred to range from about 250 to 3000 μm, especially, about 400 to 1500 μm.

Apparatus for Gas Phase Polymerization

The apparatus for a gas phase polymerization of an olefin according to the present invention comprises a fluidized bed reactor having an olefin feeding port provided at a bottom part of the reactor, and a catalyst feeding port and a polyolefin recovering port provided at side parts of the reactor, which reactor further comprises at least two deactivator introduction ports. This reactor of the apparatus for gas phase polymerization of the invention is preferred to have a height capable of forming a fluidized bed whose height is at least 3 m. One particular embodiment of the apparatus will be described below referring to FIG. 1.

Illustratively, the particular embodiment of the apparatus for gas phase polymerization according to the present invention comprises a fluidized bed reactor 1 having a fluidizing gas feeding port 2 provided at a bottom part of the reactor, a gas distributor plate 3 provided at a lower part of the reactor 1, a catalyst feeding port 4 and a polyolefin recovering port 5 positioned above the gas distributor plate 3, and a gas exhaust port 6 provided at an upper part of the reactor. Further, this reactor is provided at side part thereof with at least two deactivator introduction ports disposed at:

(a) height Ha (cm) as measured from the gas distributor plate 3, the above height Ha satisfying the relationship:

Ha=−0.3 D to 0.3 D, especially,

Ha=−0.25 D to 0.25 D wherein D represents the inside diameter (cm) of the fluidized bed reactor, for example, at a height of within +30 cm from the gas distributor plate 3, namely, just above and/or just below the gas distributor plate 3, (deactivator introduction port (a)); and/or (b) height Hb (cm) as measured from the gas distributor plate 3, the above height Hb satisfying the relationship:

Hb=0.3 D to 2.0 D, especially,

Hb=0.5 D to 1.0 D wherein D represents the inside diameter (cm) of the fluidized bed reactor (deactivator introduction port (b)).

The above deactivator introduction ports are preferably provided in both the height ranges Ha and Hb. It is preferred that the fluidized bed reactor have at least one deactivator introduction port (a) and/or at least one deactivator introduction port (b) disposed at least one position, especially, 2 to 20 positions, still especially, 3 to 15 positions and, yet still especially, 4 to 6 positions in the height Ha and/or Hb.

When a plurality of deactivator introduction ports (deactivator introduction ports (a) or deactivator introduction ports (b)) are disposed in each of the above heights Ha or Hb, the plurality of deactivator introduction ports (a) or (b) may be disposed either at different heights Has or Hbs from each other or at identical heights Ha or Hb in the height ranges described above.

When the plurality of deactivator introduction ports (a) or (b) are disposed at identical height Ha or Hb, it is preferred that the deactivator introduction ports (a) or (b) be spaced from each other at equal intervals on a single circumference of the fluidized bed reactor and further it is preferred that the deactivator introduction ports (a) and deactivator introduction ports (b) be alternately disposed at mutually equal intervals when viewed from the top of the fluidized bed reactor as shown in FIG. 3. FIG. 3 (plan view) shows the arrangement of four deactivator introduction ports $a_1$ to $a_4$ (first series) and four deactivator introduction ports $b_1$ to $b_4$ (second series) on single circumferences of the heights Ha and Hb, respectively.

The apparatus for gas phase polymerization according to the present invention is suitable for carrying out the above method of terminating a gas phase polymerization of an olefin. The use of the above apparatus for gas phase polymerization according to the present invention enables rapidly terminating the polymerization of the olefin with the use of a small amount of the deactivator.

EFFECT OF THE INVENTION

The present invention enables rapidly terminating the polymerization of the olefin even if the amount of added deactivator is small and does not cause agglomeration of the polyolefin in the fluidized bed reactor. The present invention enables terminating the polymerization of the olefin without the need to conduct a preparatory step for the termination of the polymerization, irrespective of the employed polymerization conditions, with the result that the quantity of the product produced during the termination period can be minimized. In the present invention, the fluid solid particles are obtained after the termination of the polymerization of the olefin, which can be utilized as a seed powder for initiating the polymerization of the olefin without the need to effect a treatment for removing the deactivator therefrom. Moreover, the present invention enables easily changing a product variety.

EXAMPLES

The present invention will now be further illustrated with reference to the following Examples, which in no way limit the scope of the invention.

Example 1

The polymerization of ethylene and 1-hexene and the termination of the polymerization were carried out while forming a fluidized bed of 10 m in height with the use of a continuous fluidized bed gas phase polymerization apparatus equipped with a fluidized bed reactor whose inside diameter D was 3.5 m as shown in FIG. 1.

This gas phase polymerization apparatus had deactivator introduction ports $a_1$ to $a_4$ (first series) disposed at a height of −20 cm (=−0.057 D) from the gas distributor plate and had deactivator introduction ports $b_1$ to $b_4$ (second series)

disposed at a height of 3.5 m (=1.0 D) from the gas distributor plate. These deactivator introduction ports were alternately disposed at mutually equal intervals when viewed from the top of the fluidized bed reactor as shown in FIG. 3.

Each of the deactivator introduction ports could independently be closed and opened.

Polymerization

Ethylene and 1-hexene were copolymerized on a solid catalyst consisting of bis(1,3-n-butylmethylcyclopentadienyl)zirconium dichloride, methylaluminoxane and silica, thereby obtaining a prepolymerization catalyst.

This prepolymerization catalyst had a bulk specific gravity of 0.40 g/cm$^3$, an intrinsic viscosity [$\eta$] of 2.1 dl/g and a 1-hexene content of 4.8% by weight and contained 3 g of a prepolymer and 3.2 mg of zirconium per g of the solid catalyst component.

Ethylene and 1-hexene were copolymerized in the presence of the above prepolymerization catalyst under conditions such that the total pressure was 20 kg/cm$^2$G, the polymerization temperature was 80° C. and the linear velocity of gas was 70 cm/sec, thereby continuously producing at a rate of 10 ton/hr an ethylene/1-hexene copolymer having a density of 0.920g/cm$^3$ and a melt flow rate (MFR: measured at 190° C. under a load of 2.16 kg in accordance with ASTM D1238) of 2.0 g/10 min.

Termination of Polymerization

The above copolymerization of ethylene and 1-hexene was terminated in the following manner. The blower 9 was stopped. The flare valve B was opened to thereby initiate depressurization and, simultaneously, the valve A was closed. 985.6 lit. of a deactivator gas (nitrogen gas containing 4 mol/l of CO) was introduced into the fluidized bed reactor through deactivator introduction ports $a_1$ to $a_4$ (first series) and deactivator introduction ports $b_1$ to $b_4$ (second series), thereby terminating the polymerization reaction.

The deactivator gas was uniformly fed through the deactivator introduction ports (8 nozzles) into the fluidized bed reactor. Upon the termination of the polymerization reaction, there was no agglomerated polymer in the fluidized bed reactor in which the state was such that the polymerization operation could immediately be resumed without the need to conduct any extra step.

Example 2

Termination of Polymerization

The olefin polymerization was carried out in the same manner as in Example 1, and the termination of the polymerization reaction was executed in the same manner as in Example 1 except that the deactivator gas was introduced into the fluidized bed reactor only through the first series deactivator introduction ports $a_1$ to $a_4$.

Upon the termination of the polymerization reaction, small polymer agglomerates were found in the fluidized bed reactor in which, however, the state was such that the polymerization operation could immediately be resumed without the need to conduct any extra step.

Comparative Example 1

Termination of Polymerization

The olefin polymerization was carried out in the same manner as in Example 1, and the termination of the polymerization reaction was executed in the same manner as in Example 1 except that the deactivator gas was introduced into the fluidized bed reactor only through one of the first series deactivator introduction ports (nozzle $a_1$). About half of the solid particles fused with each other in the fluidized bed reactor, thereby forming agglomerates. Therefore, opening and cleaning of the apparatus was inevitable for resuming the polymerization operation.

What is claimed is:

1. A method of terminating a gas phase polymerization of an olefin to be conducted subsequent to producing a polyolefin by feeding a gaseous olefin into a fluidized bed reactor to polymerize the gaseous olefin while holding solid particles containing a catalyst in a fluid state, said method comprising introducing a deactivator in the fluidized bed reactor through at least two deactivator introduction ports of the fluidized bed reactor so as to terminate the gas phase polymerization, wherein the fluidized bed reactor has a fluidized bed having a height of at least 3 m, and wherein the deactivator is introduced in the fluidized bed reactor having a gas distributor plate provided therein through:

(a) at least one deactivator introduction port disposed at height Ha (cm) as measured from the gas distributor plate, said height Ha satisfying the relationship:
Ha=−0.3 D to 0.3 D
wherein D represent the inside diameter (cm) of the fluidized bed reactor, and (b) at least one deactivator introduction port disposed at height Hb (cm) as measured from the gas distributor plate, said height Hb satisfying the relationship:
Hb=0.3 D to 2.0 D
wherein D represents the inside diameter (cm) of the fluidized bed reactor.

2. The method as claimed in claim 1, wherein the deactivator is at least one member selected from the group consisting of carbon monoxide, carbon dioxide, oxygen, water, alcohols having 1 to 6 carbon atoms, ketones having 1 to 6 carbon atoms and aldehydes having 1 to 6 carbon atoms and the deactivator is gaseous under gas phase polymerization conditions.

3. The method as claimed in claim 1, wherein the deactivator is introduced together with an inert gas and/or an olefin gas into the fluidized bed reactor.

4. A method of initiating a gas phase polymerization of an olefin, which comprises, after terminating the gas phase polymerization by the method as claimed in claim 1, subsequently feeding an olefin into the fluidized bed reactor and effecting a gas phase polymerization of the olefin in the presence of the solid particles remaining in the fluidized bed reactor.

5. The method as claimed in claim 1, wherein the deactivator is introduced in the fluidized bed reaction through:

(a) 2–20 deactivator introduction ports spaced around said fluidized bed disposed at a height Ha (cm) as measured from the gas distribution plate, said height Ha satisfying the relationship:
Ha=−0.25 D to 0.25 D
wherein D represents the inside diameter (cm) of the fluidized bed reactor, and (b) 2–20 deactivator introduction ports spaced around said fluidized bed and disposed at a height Hb (cm) as measured from the gas distribution plate, said height Hb satisfying the relationship:
Hb=0.5 D to 1.0 D wherein D represents the inside diameter (cm) of the fluidized bed reactor.

6. A method of terminating a gas phase polymerization of an olefin to be conducted subsequent to producing a polyolefin by feeding a gaseous olefin into a fluidized bed reactor to polymerize the gaseous olefin while holding solid particles containing a catalyst in a fluid state, said method comprising introducing a deactivator in the fluidized bed reactor through at least two deactivator introduction ports of the fluidized bed reactor so as to terminate the gas phase polymerization, wherein the fluidized bed reactor has a fluidized bed having a height of at least 3 m, and wherein the deactivator is introduced in the fluidized bed reactor having a gas distributor plate provided therein through:

2–20 deactivator introduction ports spaced around said fluidized bed and disposed at height Ha (cm) as measured from the gas distributor plate, said height Ha satisfying the relationship:

Ha=−0.3 D to 0.3 D wherein D represent the inside diameter (cm) of the fluidized bed reactor.

7. The method as claimed in claim 6, wherein the deactivator is introduced in the fluidized bed reactor through:

4–6 deactivator introduction ports evenly spaced around said fluidized bed and disposed at a height Ha (cm) as measured from the gas distribution plate, said height Ha satisfying the relationship:

Ha=−0.25 D to 0.25 D wherein D represents the inside diameter (cm) of the fluidized bed reactor.

8. A method of terminating a gas phase polymerization of an olefin to be conducted subsequent to producing a polyolefin by feeding a gaseous olefin into a fluidized bed reactor to polymerize the gaseous olefin while holding solid particles containing a catalyst in a fluid state, said method comprising introducing a deactivator in the fluidized bed reactor through at least two deactivator introduction ports of the fluidized bed reactor so as to terminate the gas phase polymerization, wherein the fluidized bed reactor has a fluidized bed having a height of at least 3 m, and wherein the deactivator is introduced in the fluidized bed reactor having a gas distributor plate provided therein through:

2–20 deactivator introduction ports spaced around said fluidized bed and disposed at a height Hb (cm) as measured from the gas distribution plate, said height Hb satisfying the relationship:

Hb=0.3 D to 2.0 D wherein D represents the inside diameter (cm) of the fluidized bed reactor.

9. The method as claimed in claim 8, wherein the deactivator is introduced in the fluidized bed reactor through:

4–6 deactivator introduction ports evenly spaced around said fluidized bed and disposed at a height Hb (cm) as measured from the gas distribution plate, said height Hb satisfying the relationship:

Hb=0.5 D to 1.0 D wherein D represents the inside diameter (cm) of the fluidized bed reactor.

10. A method of terminating a gas phase polymerization of an olefin to be conducted subsequent to producing a polyolefin by feeding a gaseous olefin into a fluidized bed reactor to polymerize the gaseous olefin while holding solid particles containing a catalyst in a fluid state, comprising the steps of:

(i) feeding a gaseous olefin into a fluidized bed reactor to polymerize the gaseous olefin while holding solid particles containing a catalyst in a fluid state, thereby producing a polyolefin; and (ii) introducing a deactivator under non-emergency conditions in the fluidized bed reactor through at least two deactivator introduction ports of the fluidized bed reactor so as to terminate the gas phase polymerization.

11. The method as claimed in claim 10, wherein the deactivator is at least one member selected from the group consisting of carbon monoxide, carbon dioxide, oxygen, water, alcohols having 1 to 6 carbon atoms, ketones having 1 to 6 carbon atoms and aldehydes having 1 to 6 carbon atoms and the deactivator is gaseous under gas phase polymerization conditions.

12. The method as claimed in claim 10, wherein the deactivator is introduced together with an inert gas and/or an olefin gas into the fluidized bed reactor.

13. A method of a gas phase polymerization of an olefin, consisting essentially of the steps of:

(i) feeding a gaseous olefin into a fluidized bed reactor to polymerize the gaseous olefin while holding solid particles containing a catalyst in a fluid state, thereby producing a polyolefin;

(ii) introducing a deactivator in the fluidized bed reactor through at least two deactivator introduction ports of the fluidized bed reactor so as to terminate the gas phase polymerization; and (iii) subsequently feeding a gaseous olefin into the fluidized bed reactor to initiate a gas phase polymerization of the olefin in the presence of the solid particles remaining in the fluidized bed reactor.

14. The method as claimed in claim 13, wherein the deactivator is at least one member selected from the group consisting of carbon monoxide, carbon dioxide, oxygen, water, alcohols having 1 to 6 carbon atoms, ketones having 1 to 6 carbon atoms and aldehydes having 1 to 6 carbon atoms and the deactivator is gaseous under gas phase polymerization conditions.

15. The method as claimed in claim 13, wherein the deactivator is introduced together with an inert gas and/or an olefin gas into the fluidized bed reactor.

16. The method as claimed in claim 13, wherein the step (iii) is conducted without carrying out a treatment for removing the deactivator.

17. The method as claimed in claim 13, wherein the step (iii) is conducted after purging the inside of the fluidized bed reactor with an inert gas.

* * * * *